(12) United States Patent
Kitabayashi (10) Patent No.: US 8,115,996 B2
(45) Date of Patent: Feb. 14, 2012

(54) SCREEN FABRIC AND SCREEN

(75) Inventor: Masashi Kitabayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/972,694

(22) Filed: Dec. 20, 2010

(65) Prior Publication Data

US 2011/0176209 A1   Jul. 21, 2011

(30) Foreign Application Priority Data

Jan. 18, 2010 (JP) ................. 2010-007879

(51) Int. Cl.
*G03B 21/56* (2006.01)

(52) U.S. Cl. ........................ 359/443; 359/461

(58) Field of Classification Search ............... 359/443, 359/461
See application file for complete search history.

(56) References Cited

U.S. PATENT DOCUMENTS

| | | | | |
|---|---|---|---|---|
| 2,875,087 | A * | 2/1959 | Crandon ..................... 427/273 |
| 4,206,969 | A * | 6/1980 | Cobb et al. ................... 359/452 |
| 6,258,443 | B1 * | 7/2001 | Nilsen et al. .................. 428/156 |
| 7,110,176 | B2 * | 9/2006 | Maruta et al. ................. 359/459 |
| 7,221,508 | B2 * | 5/2007 | Maruta et al. ................. 359/459 |
| 7,361,297 | B2 * | 4/2008 | Enewoldsen et al. ......... 264/511 |
| 2005/0185279 | A1 * | 8/2005 | Mullen et al. ................ 359/530 |
| 2005/0248843 | A1 * | 11/2005 | Maruta et al. ................ 359/459 |
| 2007/0065638 | A1 * | 3/2007 | Wang et al. .................. 428/141 |
| 2007/0217005 | A1 * | 9/2007 | Novet et al. .................. 359/459 |

FOREIGN PATENT DOCUMENTS

| | | | |
|---|---|---|---|
| JP | 2304765 | * | 6/1994 |
| JP | 6-230475 | A | 8/1994 |
| JP | 2006-215162 | A | 8/2006 |

* cited by examiner

*Primary Examiner* — Clayton E LaBalle
*Assistant Examiner* — Kevin Butler
(74) *Attorney, Agent, or Firm* — AdvantEdge Law Group, LLC (57) ABSTRACT

A screen fabric includes a stack of a plurality of layers. The plurality of layers include: a first layer that forms a surface layer on which a three-dimensional portion is to be formed; and a second layer that is different from the first layer. The first layer is made of a vinyl chloride resin, and the second layer has a lower hardness than the first layer.

9 Claims, 10 Drawing Sheets

SCREEN FABRIC AND SCREEN

BACKGROUND

1. Technical Field

The present invention relates to a screen fabric and a screen.

2. Related Art

As a screen for a projector, a screen including a screen member that has three-dimensional portions on the surface thereof has been proposed (see, e.g., JP-A-2006-215162 (Patent Document 1)).

In the screen described in Patent Document 1, a three-dimensional portion (unit shape part) is formed on the surface, and a reflection plane is formed only on a portion of the surface of the three-dimensional portion so that an excellent image can be displayed.

It has also been proposed to use a sheet made of a soft vinyl chloride resin (soft vinyl chloride resin sheet) as a screen substrate (see, e.g., JP-A-6-230475 (Patent Document 2)). As compared with the case of using polyethylene terephthalate (PET), etc., which is a widespread material for a screen substrate, the use of a vinyl chloride resin as a material makes it possible to reduce the material cost.

It will then be possible to use a sheet made of a soft vinyl chloride resin as a screen fabric and form a three-dimensional portion on the surface of the screen fabric.

However, when a sheet made of a soft vinyl chloride resin is used as a material for a screen fabric, it is necessary to laminate a backing thereto, such as a glass cloth layer, for the purpose of ensuring strength, etc., as shown in Patent Document 2.

Therefore, there is a problem in that when the fabric is left in a rolled state (e.g., left at a room temperature of 60° C. for 72 hours), three-dimensional portions are pressurized while in contact with the backing, and thus the three-dimensional portions are likely to deform.

SUMMARY

An advantage of some aspects of the invention is to provide a screen fabric suitable for being made of a vinyl chloride resin and a screen.

A screen fabric according to an aspect of the invention includes a stack of a plurality of layers. The plurality of layers include a first layer that forms a surface layer on which a three-dimensional portion is to be formed and a second layer that is different from the first layer. The first layer is made of a vinyl chloride resin, and the second layer has a lower hardness than the first layer.

According to the aspect of the invention, the first layer is made of a vinyl chloride resin, and the second layer has a lower hardness than the first layer. As a result, when a three-dimensional portion is formed on the surface of the first layer, and such a screen fabric is left in a rolled state, the three-dimensional portion is subjected to pressure while in contact with the second layer that has a lower hardness than the three-dimensional portion. Therefore, even in the case where the first layer is made of a soft vinyl chloride resin, for example, the deformation of the three-dimensional portion can be suppressed. Further, because the first layer is made of a vinyl chloride resin, the material cost for the screen fabric can be reduced, and also flame resistance can be improved.

It is preferable that the first layer is made of a hard vinyl chloride resin, and the second layer is made of a soft vinyl chloride resin.

In this case, because the first layer is made of a hard vinyl chloride resin, the first layer is less likely to have a wrinkled surface due to being left in a rolled state (e.g., left at a room temperature of 60° C. for 72 hours), etc.

Incidentally, a screen fabric made of a hard vinyl chloride resin has problems in that such a screen fabric is likely to curl when left in a rolled state (e.g., left at a room temperature of 60° C. for 72 hours), etc.; a prolonged transfer at a high temperature is required to transfer a three-dimensional portion with sufficient accuracy, so such a screen fabric is not suitable for roll embossing; and the surface thereof is easily scratched.

However, in this case, the second layer is made of a soft vinyl chloride resin. As a result, the screen fabric is more flexible than when made only of a hard vinyl chloride resin, and thus is less likely to curl. Further, the first layer can be made as thin as 0.1 mm or less, for example, so that when the surface of the first layer is pressed, the first layer sinks into the second layer. This makes it possible to transfer a three-dimensional portion with high accuracy by roll embossing and also to render the surface of the first layer resistant to scratches with fingernails, etc.

It is preferable that the screen fabric has a two-layer structure including the first layer and the second layer joined together.

In this case, the screen fabric has a two-layer structure, which is a simple structure with a small number of layers stacked. Therefore, the structure can be provided with resistance to curling.

It is preferable that the first layer is made of a soft vinyl chloride resin, and the second layer is resilient against the first layer.

In this case, the first layer is made of a soft vinyl chloride resin, and the second layer is resilient against the first layer. As a result, when the screen fabric is left in a rolled state, the second layer is dented to the shape of a three-dimensional portion, and, therefore, the deformation of the three-dimensional portion can be suppressed even more.

A screen according to another aspect of the invention includes the screen fabric mentioned above.

According to the aspect of the invention, the screen includes the screen fabric, and thus has similar advantages to the screen fabric.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described hereinafter with reference to drawings.

Structure of Screen

Figure 1:
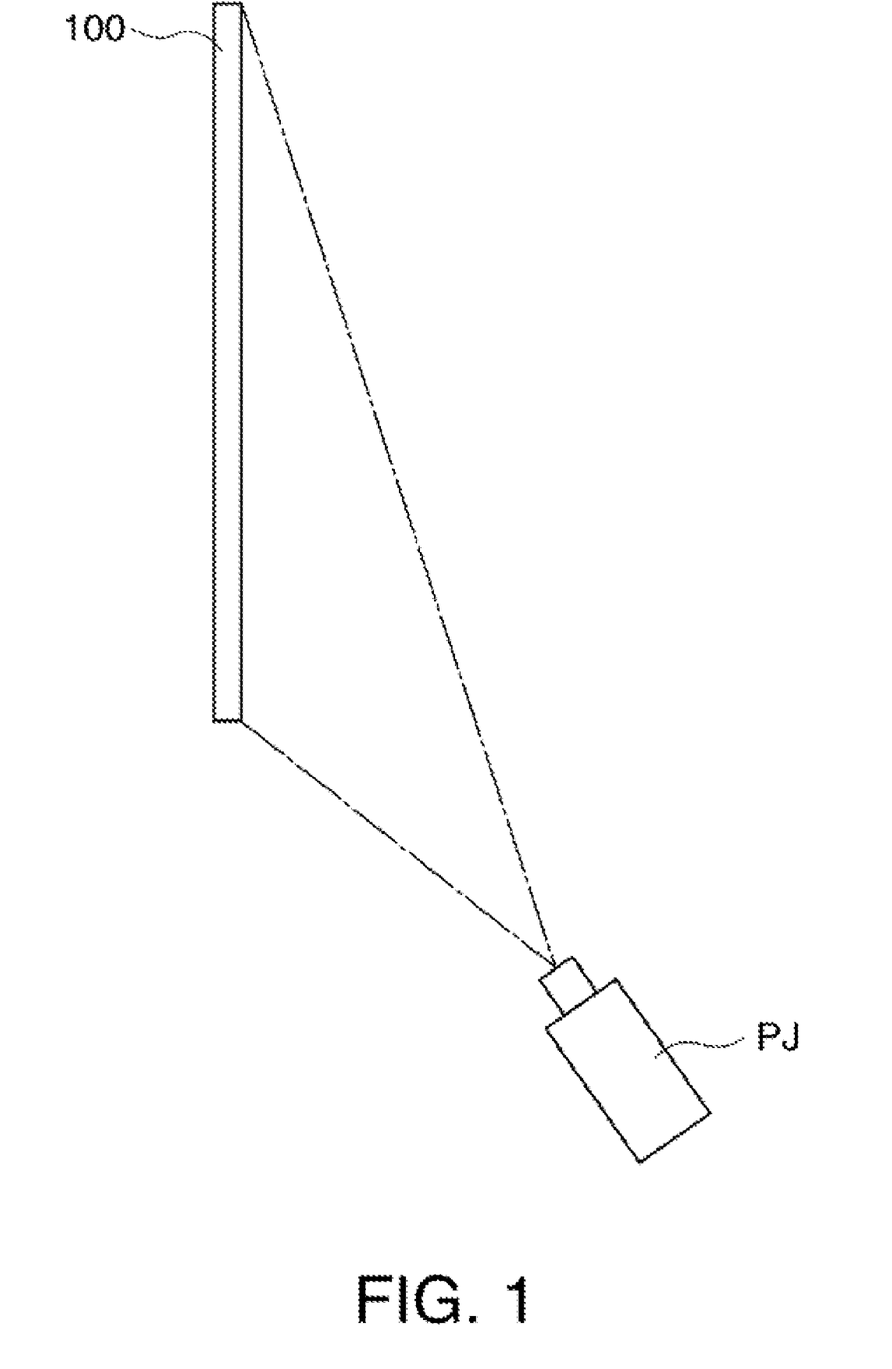
FIG. 1 schematically shows the use of a screen according to a first embodiment.

FIG. 1 schematically shows the use of a screen 100.

Figure 2:
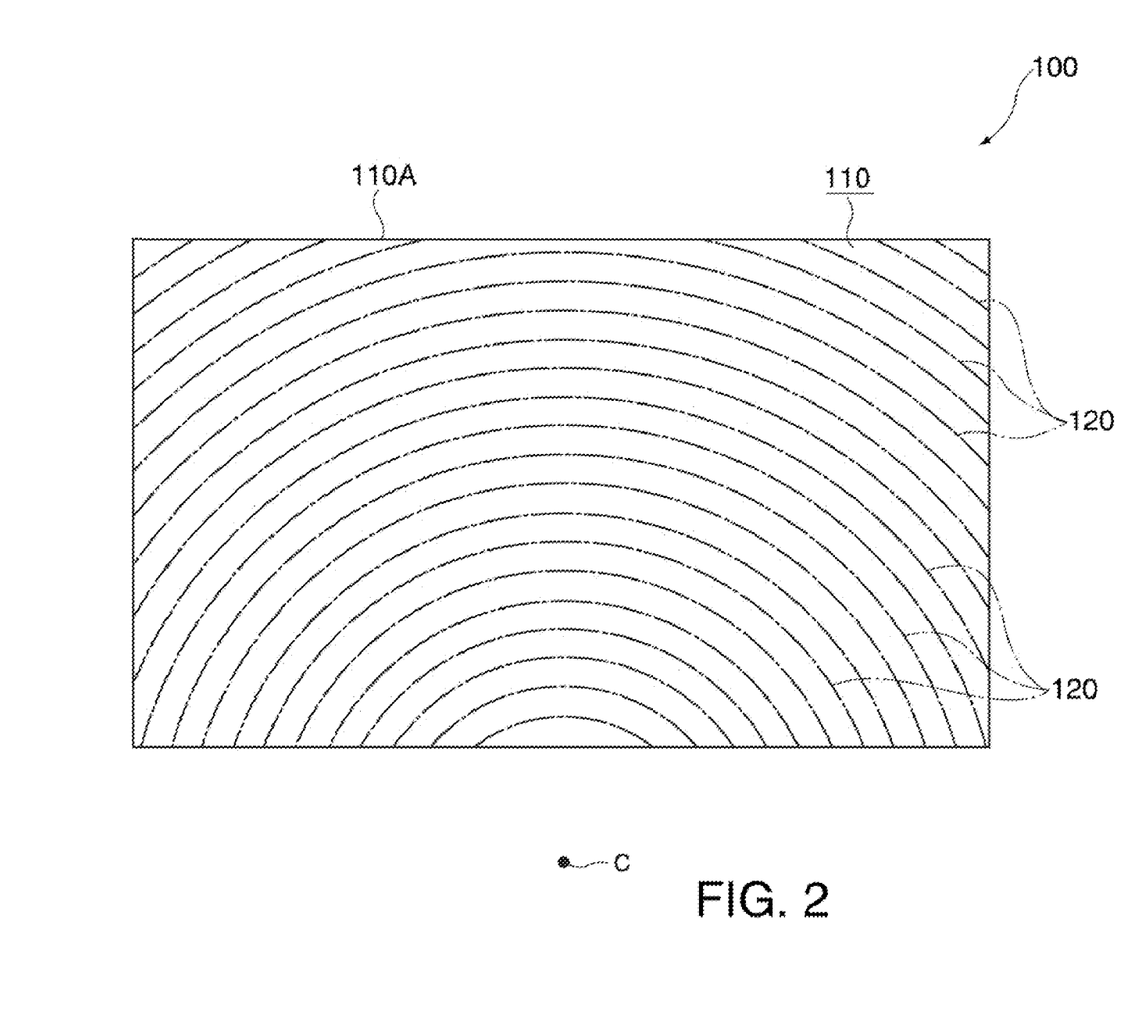
FIG. 2 schematically shows the configuration of the screen according to the first embodiment.
Figure 3:
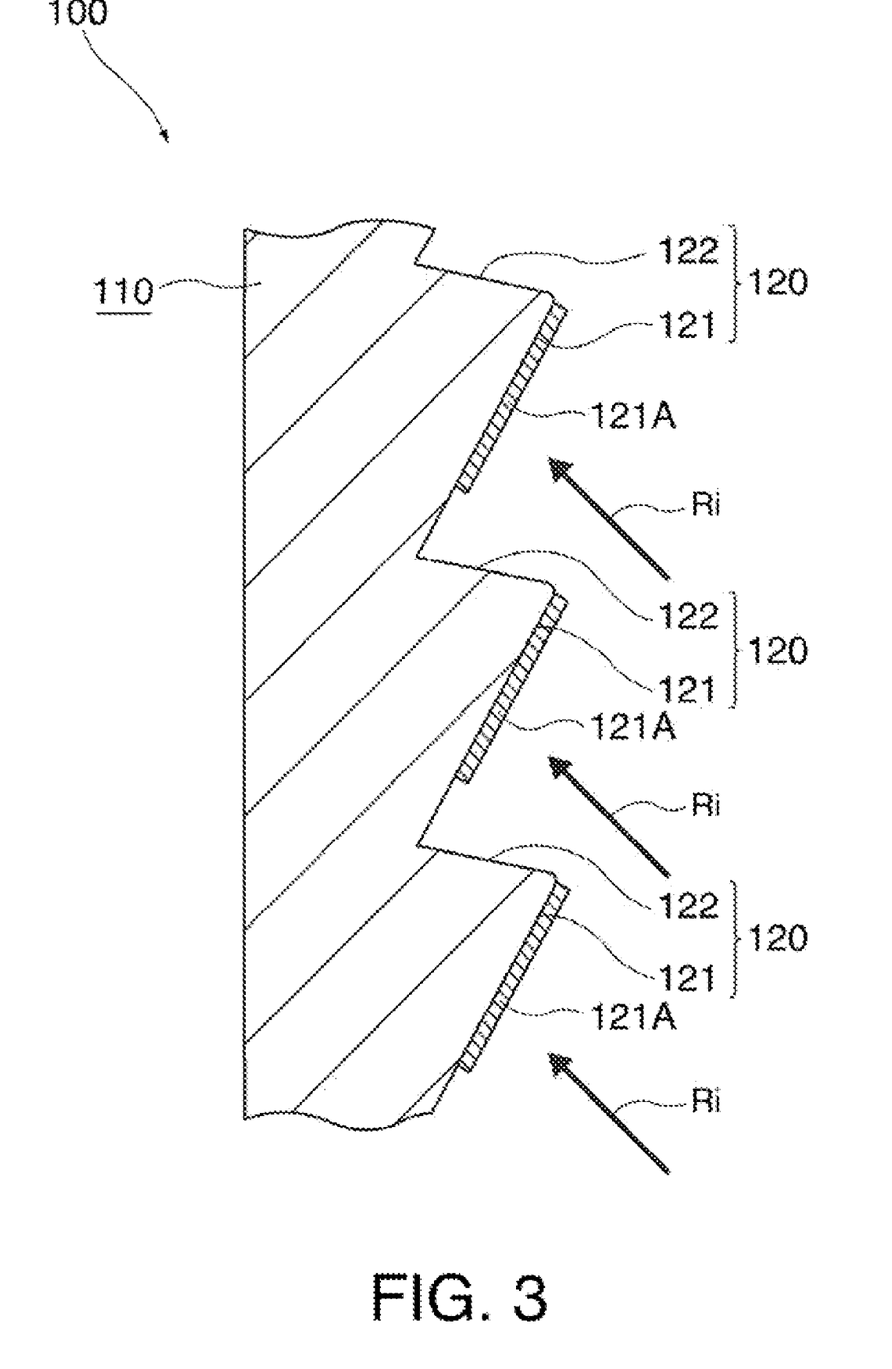
FIG. 3 schematically shows the configuration of the screen according to the first embodiment.

FIGS. 2 and 3 schematically show the configuration of the screen 100. Specifically, FIG. 2 is a plan view of the screen 100, and FIG. 3 is a longitudinal sectional view of the screen 100.

As shown in FIG. 1 or 2, the screen 100 is formed of a reflection-type screen with a wide, rectangular shape. The screen 100 reflects image light, which is emitted from a proximity-projection-type projector PJ (FIG. 1) in an oblique lower position, toward the front to display a projected image.

As shown in FIG. 2, the screen 100 includes a substrate 110 on the front side thereof. On the surface of the substrate 110, there is a ridge portion 120 (equivalent to the three-dimensional portion according to the invention) in an arc shape along the horizontal direction, and a large number of such ridge portions 120 are repeatedly placed. That is, the substrate 110 has the ridge portions 120 on one surface thereof.

As shown in FIG. 2, the ridge portions 120 are formed in concentric circles around an imaginal position C in a lower position than the substrate 110, and arranged side by side with one another along the vertical direction (longitudinal direction).

Specifically, as shown in FIG. 3, each ridge portion 120 has a triangular cross section (prismatic shape) including an incidence-opposed plane 121 that faces the incident direction Ri of image light from the projector PJ (in this embodiment, obliquely downward) and a non-incidence plane 122 that faces the non-incident direction of image light (in this embodiment, obliquely upward).

Further, in the substrate 110, a reflective layer 121A is formed on the surface of the incidence-opposed plane 121. In other words, the substrate 110 includes a light-reflecting reflective layer 121A on a portion of the surface of the ridge portion 120 (on the surface of the incidence-opposed plane 121).

The substrate 110 is obtained by shaping a screen fabric as follows. That is, the screen 100 includes the below-described shaped screen fabric.

Structure of Screen Fabric

Figure 4A:
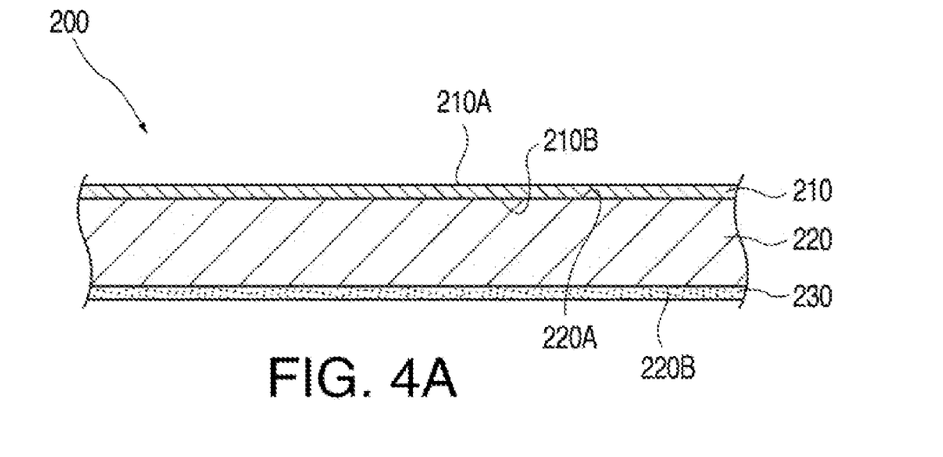
FIGS. 4A to 4C schematically show cross sections of a screen fabric and the screen according to the first embodiment.
Figure 4B:
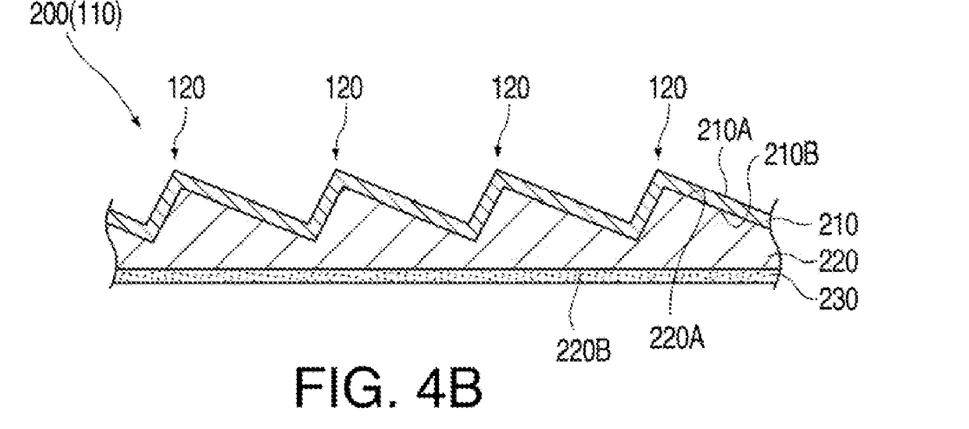
Figure 4C:
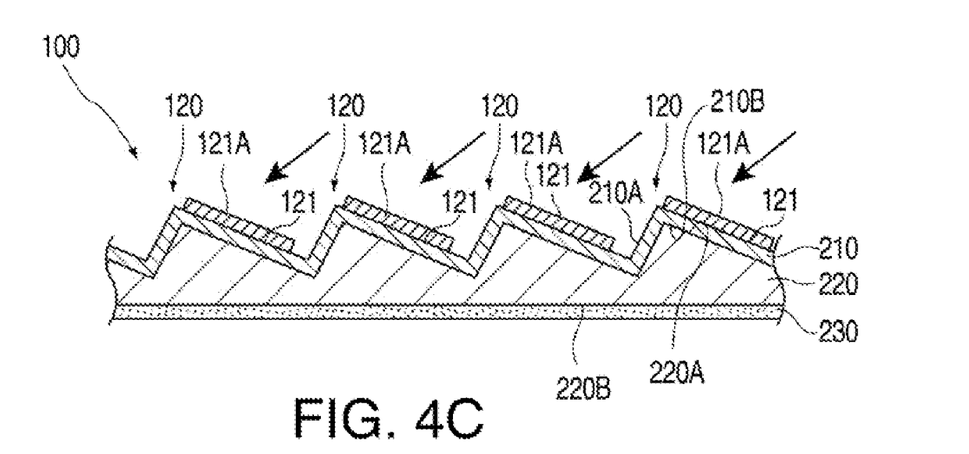

FIGS. 4A to 4C schematically show cross sections of a screen fabric 200 and the screen 100.

FIG. 4A and FIG. 4B show the structures of the screen fabric 200 before shaping and after shaping, respectively. FIG. 4C shows the structure of the screen 100 obtained by forming a reflective layer 121A on the shaped screen fabric 200.

As shown in FIG. 4A, the screen fabric 200 has a structure in which a hard PVC layer 210 as the first layer, a soft PVC layer 220 as the second layer, and a protective film 230 are sequentially stacked.

As shown in FIG. 4B, in the production of the screen 100, ridge portions 120 are formed on a first surface 210A of the hard PVC layer 210. In other words, in the screen fabric 200, the hard PVC layer 210 forms a surface layer on which ridge portions 120 are to be formed.

The hard PVC layer 210 is a layer made of a vinyl chloride resin prepared without using a plasticizer (hard vinyl chloride resin). A plasticizer enters between the polymer molecules of the vinyl chloride resin to increase the intermolecular space. Examples thereof include polyester adipate, di-2-ethylhexyl phthalate, and di-2-ethylhexyl adipate.

Specifically, the hard PVC layer 210 has a thickness of 0.05 mm to 0.1 mm. In this embodiment, the thickness is 0.06 mm.

The soft PVC layer 220 is formed on a second surface 210B of the hard PVC layer 210. Specifically, the hard PVC layer 210 is formed by laminating a sheet made of a hard vinyl chloride resin to a first surface 220A of the soft PVC layer 220.

The soft PVC layer 220 is a layer made of a vinyl chloride resin prepared using a plasticizer (soft vinyl chloride resin). Specifically, the soft PVC layer 220 is formed 0.3 mm thick (including the thickness of the protective film 230). Thus, the screen fabric 200 has a laminated structure in which the soft PVC layer 220 that has a lower hardness than the hard PVC layer 210 serves as the substrate, and the hard PVC layer 210 is joined to the soft PVC layer 220.

The protective film 230 is formed on a second surface 220B of the soft PVC layer 220.

The protective film 230 is a black layer formed by applying a black coating agent to the second surface 220B of the soft PVC layer 220. The protective film 230 protects the soft PVC layer 220, and also, because its color is black, it absorbs incident light.

Method for Producing Screen

The screen 100 shown in FIG. 4C is formed as follows.

Figure 5:
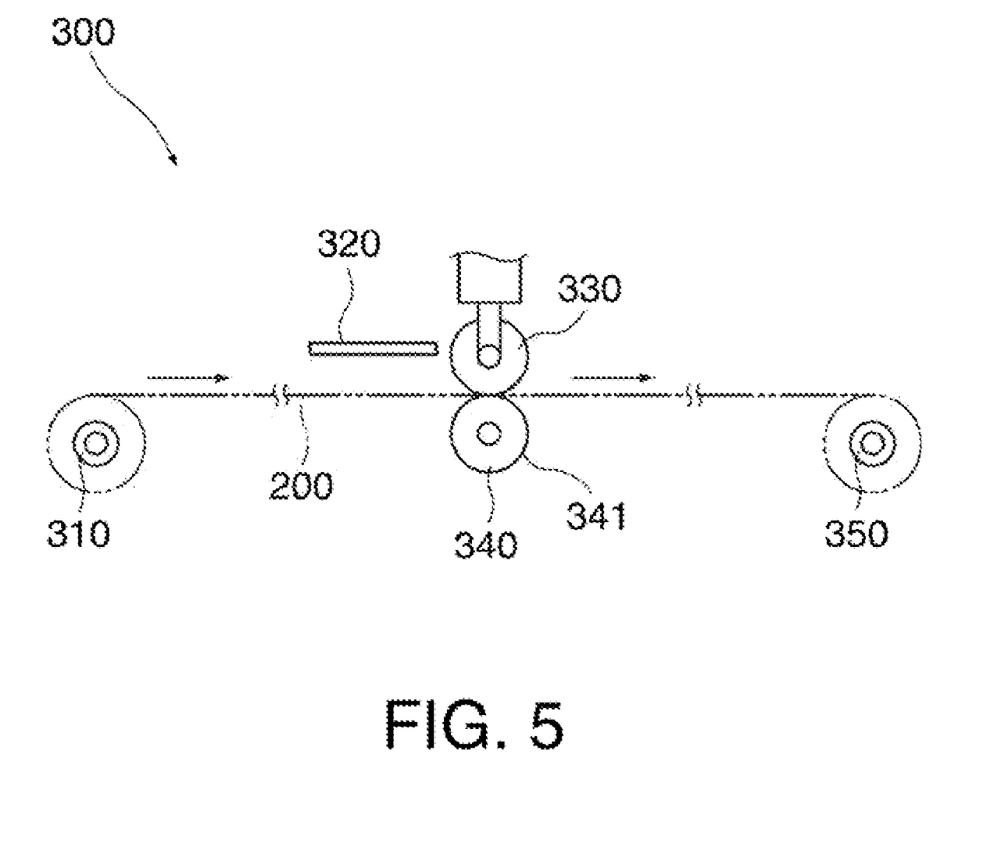
FIG. 5 schematically shows the configuration of a screen-shaping apparatus in the first embodiment.

FIG. 5 schematically shows the configuration of an apparatus for shaping the screen fabric 200.

A shaping apparatus 300 is a roll embosser and includes a feed roller 310, a heating apparatus 320, a press roller 330, a transfer roller 340 as a shaping die, and a take-up roller 350.

In this embodiment, a roll of the screen fabric 200 is set on the feed roller 310. One end of the set screen fabric 200 is drawn and, through between the press roller 330 and the transfer rollers 340, fixed on the take-up roller 350. The shaping apparatus 300 is then driven.

The feed roller 310 feeds the screen fabric 200 in the form of a sheet. The heating apparatus 320 heats the screen fabric 200 fed from the feed roller 310. The press roller 330 presses the screen fabric 200 against the transfer roller 340. The transfer roller 340 has on the peripheral surface 341 thereof a shape to be transferred to the screen fabric 200, and forms ridge portions 120 on one surface of the screen fabric 200 (first surface 210A of the hard PVC layer 210) as shown in FIG. 4B. The take-up roller 350 takes up the screen fabric 200 into a roll.

Thus, the screen fabric 200 fed in the form of a sheet from the roller 310 is heated by the heating apparatus 320, and passed through between the press roller 330 and the transfer rollers 340 so that a prism shape is formed thereon. The screen fabric 200 is then taken up by the roller 350.

The thus-shaped screen fabric 200 is cut to a predetermined size to give a substrate 110 as shown in FIG. 2, which has a large number of ridge portions 120 formed in a projection area 110A with a rectangular shape.

After the substrate 110 is formed, a reflective layer 121A is formed using a deposition apparatus (not illustrated). Specifically, the deposition apparatus deposits aluminum (Al) in vacuum obliquely on a portion of the surfaces of the ridge portions 120 (on the surfaces of incidence-opposed planes 121) to form a reflective layer 121A on the incidence-opposed planes 121 as shown in FIG. 4C. Prior to the deposition by the deposition apparatus, the first surface 210A of the hard PVC layer 210, which has formed thereon the ridge portions 120, may be subjected to a surface modification treatment, such as plasma discharge, so as to achieve efficient deposition.

The screen 100 has the above structure, and thus allows image light from the projector PJ to be reflected by the reflective layer 121A toward the front, thereby displaying a projected image. The screen 100 also allows other light that is not reflected by the reflective layer 121A (light other than image light) to be absorbed by the protective film 230.

The first embodiment provides the following advantages.

The hard PVC layer 210 is made of a vinyl chloride resin, and the soft PVC layer 220 has a lower hardness than the hard PVC layer 210. As a result, when the screen 100 is left in a rolled state, the ridge portions 120 are subjected to pressure while in contact with the soft PVC layer 220 that has a lower hardness than the ridge portions 120. Therefore, the deformation of the ridge portions 120 can be suppressed. Further, because the hard PVC layer 210 is made of a vinyl chloride resin, the material cost for the screen fabric 200 can be reduced, and also flame resistance can be improved.

The hard PVC layer 210 is made of a hard vinyl chloride resin. Therefore, the hard PVC layer 210 is less likely to have a wrinkled surface due to being left in a rolled state (e.g., left at a room temperature of 60° C. for 72 hours), etc. The soft PVC layer 220 is made of a soft vinyl chloride resin. Therefore, the screen fabric 200 is more flexible than when made only of a hard vinyl chloride resin, and thus is less likely to curl.

Further, the hard PVC layer 210 is as thin as 0.06 mm. Therefore, when the surface of the hard PVC layer 210 is pressed, the hard PVC layer 210 sinks into the soft PVC layer 220. This makes it possible to transfer the ridge portions 120 with high accuracy by roll embossing and also to render the surface of the hard PVC layer 210 resistant to scratches with fingernails, etc.

The screen fabric 200 has a two-layer structure including the hard PVC layer 210 and the soft PVC layer 220, which is a simple structure with a small number of layers stacked. Therefore, the structure can be provided with higher resistance to curling as compared with the case of the structure including three or more layers.

Usually, the strength of a sheet made of a soft vinyl chloride resin is ensured by a structure in which a glass cloth layer is sandwiched between a front-side fabric and a back-side fabric. In the case where such a back-side fabric is present, when the press is opened at a high temperature (e.g., a press open temperature of 200° C.) during embossing, the air trapped in the glass cloth layer may swell and explode, causing crater-like defects. In order to prevent such defects, it is necessary that the press is opened at a reduced temperature (e.g., a press open temperature of 150° C.), but this reduces productivity.

In this embodiment, strength is ensured by the hard PVC layer 210 formed on the first surface 220A of the soft PVC layer 220, and there is no glass cloth layer or back-side fabric. Accordingly, air is not enclosed in the fabric, defects can thus be reliably suppressed, and productivity can be improved.

The hard PVC layer 210 provides a hard surface, while the soft PVC layer 220 provides a soft interior. This ensures resistance to pressure even at a high temperature of, for example, 60° C.

In other words, the advantageous properties of both a screen fabric made of a soft vinyl chloride resin and a screen fabric made of a hard vinyl chloride resin can be obtained.

Image light projected from the projector PJ obliquely to the screen 100 can be reflected toward the front of the screen 100 (toward the viewer), and other light can be absorbed by the protective film 230. Accordingly, the contrast of the image displayed on the screen 100 can be improved. Further, with respect to the projector PJ itself, the luminance of the image light can be lowered, and the power consumption of the light source of the projector PJ can be reduced.

In the case where the reflective layer of aluminum or the like is formed by vacuum deposition, when the layer forming the reflective layer is made of a soft vinyl chloride resin, a volatile gas is produced due to the exudation of a plasticizer, etc., and this results in a longer deposition time.

However, because the layer forming the reflective layer 121A in this embodiment (hard PVC layer 210) is made of a hard vinyl chloride resin, the deposition time can be shorter than in the case where the layer is made of a soft vinyl chloride resin.

Further, the hard PVC layer 210 that comes in contact with the transfer roller 340 during embossing is made of a hard vinyl chloride resin that does not contain a plasticizer, and, therefore, the die (transfer roller 340) can be protected from degradation due to the adhesion of components of the screen fabric 200. Examples of the adhesion of components include the precipitation of components of a plasticizer of a soft vinyl chloride resin (chlorine, antimony, etc.), the adhesion of a coating agent applied on the surface of a soft vinyl chloride resin sheet, and some of pieces chipped off the ridge portions 120 upon the separation of a fabric made of a soft vinyl chloride resin from the die.

Second Embodiment

Next, a second embodiment of the invention will be described hereinafter with reference to drawings.

In the following description, the same structures and components as in the first embodiment are indicated by the same reference numerals, and the detailed description thereof will be omitted or simplified. A screen 100 according to this embodiment is different from that of the first embodiment only in the structure of the screen fabric, and other structures, the production method, and the like are the same as in the first embodiment.

Structure of Screen Fabric

Figure 6A:
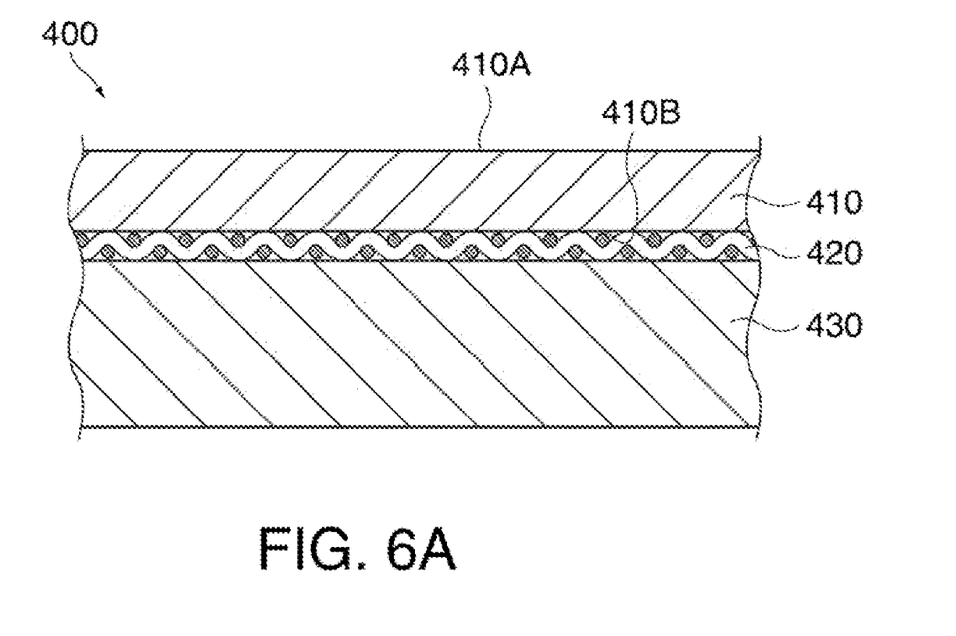
FIGS. 6A and 6B schematically show cross sections of a screen fabric according to a second embodiment.
Figure 6B:
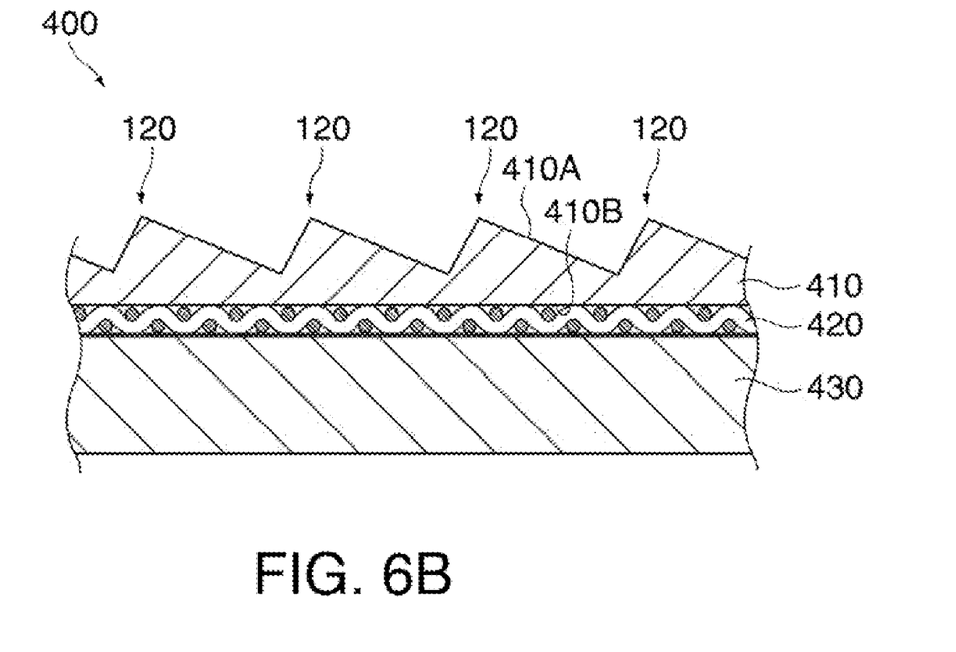

FIGS. 6A and 6B schematically show cross sections of a screen fabric 400 according to this embodiment.

FIG. 6A shows the structure of the screen fabric 400 before embossing, and FIG. 6B shows the structure of the screen fabric 400 after embossing.

As shown in FIG. 6A, the screen fabric 400 has a structure in which a soft PVC layer 410 made of a soft vinyl chloride resin as the first layer, a glass cloth layer 420 as a reinforcing layer, and a urethane layer 430 as the second layer are sequentially stacked.

As shown in FIG. 6B, in the production of the screen 100, ridge portions 120 are formed on a first surface 410A of the soft PVC layer 410. Specifically, the soft PVC layer 410 has a thickness of 0.35 mm. In addition, the first surface 410A has a surface coating (not illustrated). Specifically, the surface coating is a coating of an organic matter formed on the surface of a sheet made of a soft vinyl chloride resin, which is used as a material for the soft PVC layer 410. Because of the presence of the surface coating, a reflective layer 121A can be efficiently deposited thereon.

On the side of the soft PVC layer 410 having a second surface 410B, the urethane layer 430 is formed via the glass cloth layer 420. Specifically, the glass cloth layer 420 has a thickness of 0.1 mm, and is black to absorb incident light. The glass cloth layer 420 serves to prevent the soft vinyl chloride resin sheet from stretching, and is laminated on the back side of the sheet.

Specifically, the urethane layer 430 is formed by laminating a sheet made of urethane on the side of the soft PVC layer 410 having the second surface 410B that has formed thereon the glass cloth layer 420.

The urethane layer 430 is a shock absorber, and is resilient against the soft PVC layer 410. Specifically, the urethane layer 430 has a thickness of 5 mm to 10 mm.

As shown in FIG. 6B, in the screen fabric 400, after embossing, a soft vinyl chloride resin exuding from the surface soft PVC layer 410 and urethane are welded and joined together. By embossing under heat, the urethane layer 430 is compressed to 1/10 or less of its original thickness.

Thus, the screen fabric 400 has a structure in which the soft PVC layer 410 serves as the substrate, and the urethane layer 430 that is softer than the soft PVC layer 410 is stacked on the second-surface-410B side of the soft PVC layer 410.

Thus, the screen fabric 400 has a laminated structure in which the soft PVC layer 410 serves as the substrate, and the urethane layer 430 that has a lower hardness than the soft PVC layer 410 is joined to the soft PVC layer 220 via the glass cloth layer 120.

The second embodiment provides the following advantages.

Figure 7:
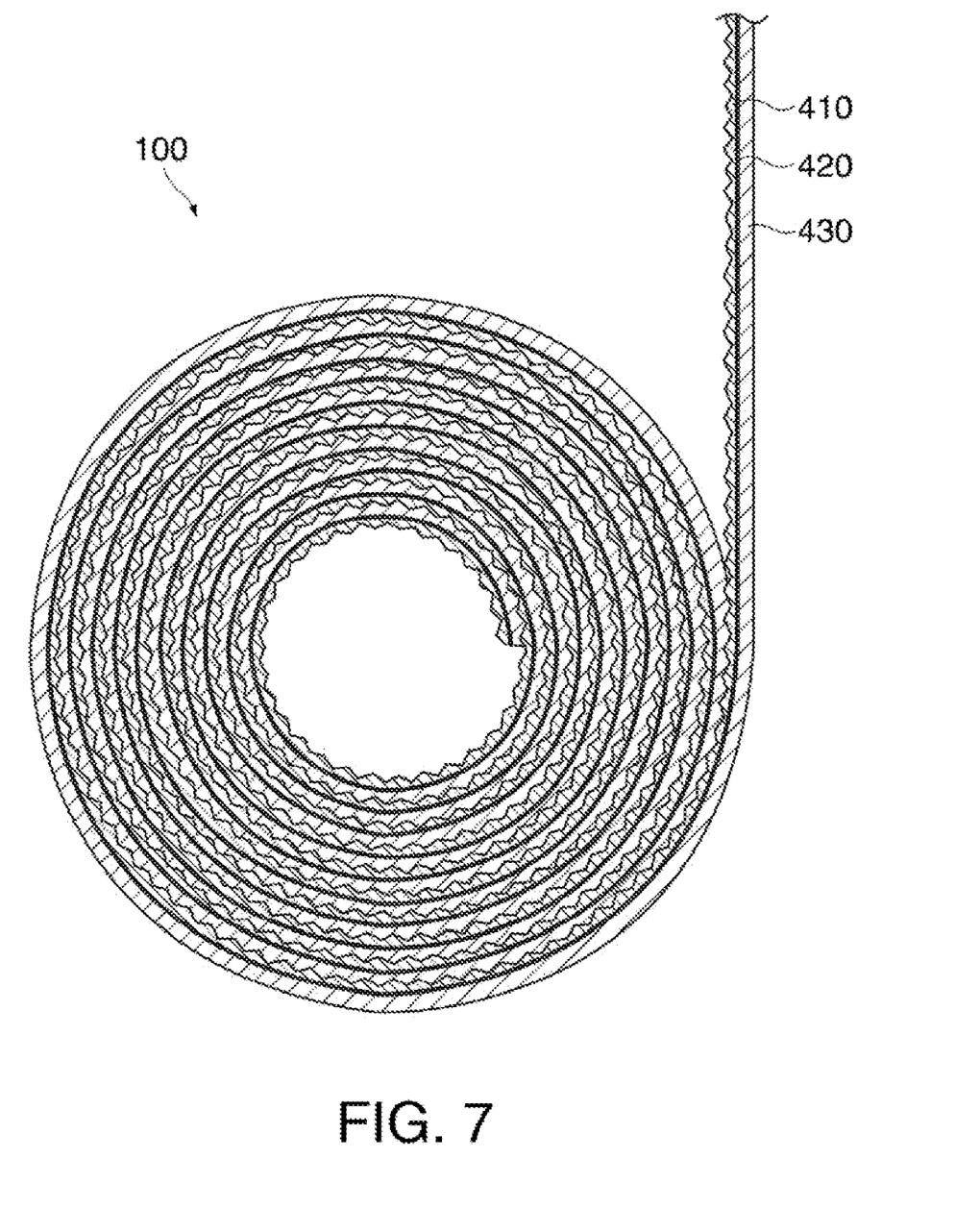
FIG. 7 schematically shows a rolled state of a screen according to the second embodiment.

The soft PVC layer 410 is made of a vinyl chloride resin, and the urethane layer 430 has a lower hardness than the soft PVC layer 410. As a result, when the screen 100 is left in a rolled state, the ridge portions 120 are subjected to pressure while in contact with the urethane layer 430 that has a lower hardness than the ridge portions 120. Therefore, the deformation of the ridge portions 120 can be suppressed. In particular, the soft PVC layer 410 is made of a soft vinyl chloride resin, and the urethane layer 430 is resilient against the soft PVC layer 410. As a result, even when left in a rolled state, the urethane layer 430 is dented to the shape of the ridge portions 120 as shown in FIG. 7. Therefore, the deformation of the ridge portions 120 can be suppressed even more.

Further, because the soft PVC layer 410 is made of a vinyl chloride resin, the material cost for the screen fabric 400 can be reduced, and also flame resistance can be improved.

The screen fabric 400 has a structure in which the soft PVC layer 410 and the urethane layer 430 are joined via the glass cloth layer 420. The soft PVC layer 410 is made of a soft vinyl chloride resin, and the urethane layer 430 is softer than the soft PVC layer 410. Therefore, the screen fabric 400 can be less likely to curl. Because of the presence of the glass cloth layer 420, strength can be obtained even in the case where soft members are joined together, whereby handleability can be improved.

Further, the soft PVC layer 410 is made of a soft vinyl chloride resin, and this makes it possible to transfer the ridge portions 120 with high accuracy by roll embossing and also to render the surface of the soft PVC layer 410 resistant to scratches with fingernails, etc.

In other words, the advantageous properties of both a screen fabric made of a soft vinyl chloride resin and a screen fabric made of a hard vinyl chloride resin can be obtained.

Further, like in the first embodiment, image light projected from the projector PJ obliquely to the screen 100 can be reflected toward the front of the screen 100 (toward the viewer), and other light can be absorbed by the protective film 230. Accordingly, the contrast of the image displayed on the screen 100 can be improved. Further, with respect to the projector PJ itself, the luminance of the image light can be lowered, and the power consumption of the light source of the projector PJ can be reduced.

The invention is not limited to the above embodiments, and, to the extent that the advantages of the invention can be provided, any deformation, improvement, and the like are encompassed by the scope of the invention.

The structure of the screen fabric is not limited to any of the examples shown in the above embodiments.

FIG. 8, FIG. 9, and FIGS. 10A and 10B each schematically show a cross section of a screen fabric according to a variation.

Figure 8:
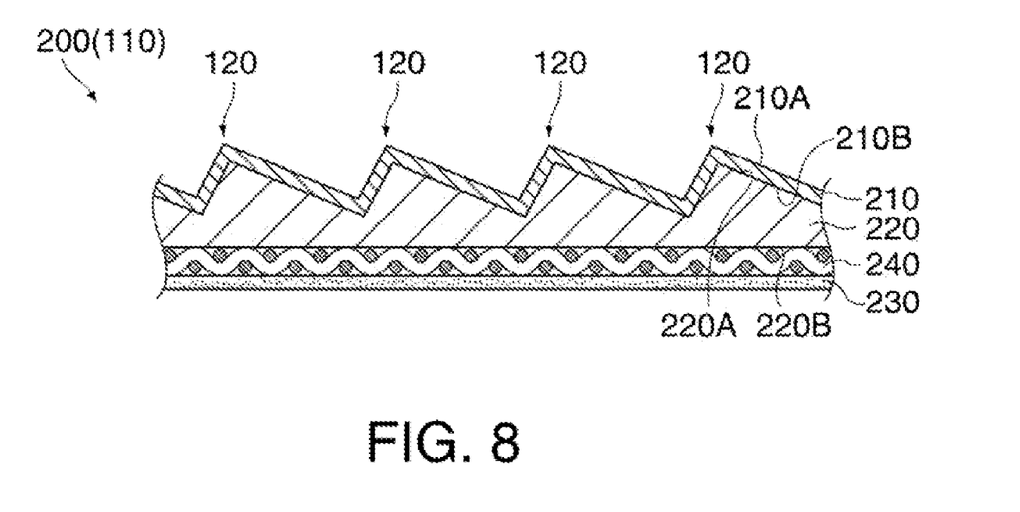
FIG. 8 schematically shows a cross section of a screen fabric according to a variation.
Figure 9:
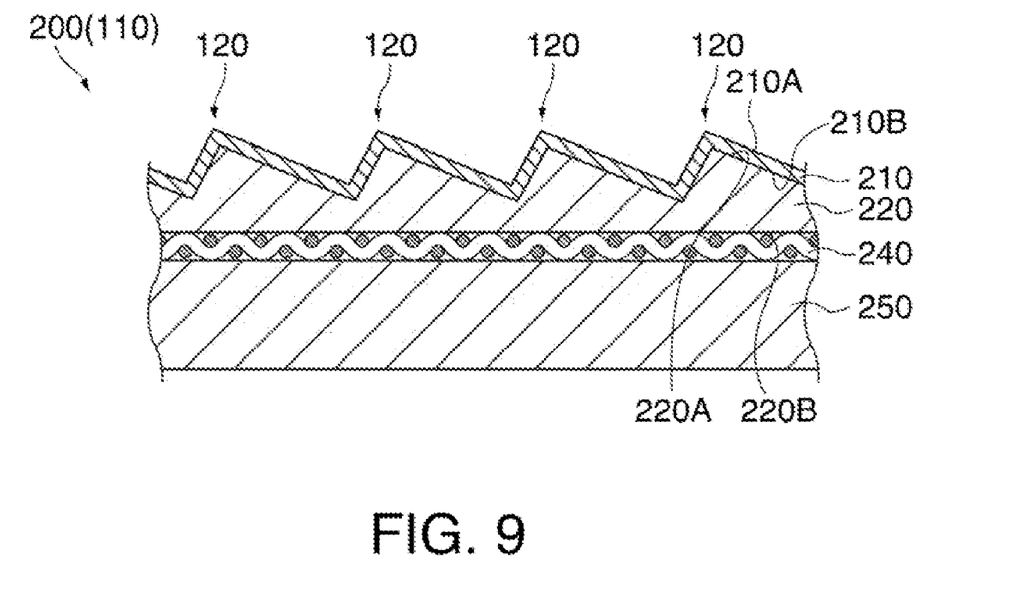
FIG. 9 schematically shows a cross section of a screen fabric according to a variation.

FIGS. 8 and 9 show variations of the screen fabric 200 of the first embodiment, which are different from the fabric of the first embodiment in that they each include a glass cloth layer 240. In other respects, they are the same as in the first embodiment.

The screen fabric 200 shown in FIG. 8 has a glass cloth layer 240 formed on the second surface 220B of the soft PVC layer 220. The structure of the glass cloth layer 240 is the same as that of the glass cloth layer 420 of the second embodiment. Like this, when the soft PVC layer 220 is sandwiched between the hard PVC layer 210 and the glass cloth layer 240, such a structure imparts strength to the front side and back side of the screen fabric 200, making it less likely to curl.

The screen fabric 200 shown in FIG. 9 is the screen fabric 200 shown in FIG. 8 with the protective film 230 being replaced with an additional soft PVC layer 250 made of a soft vinyl chloride resin. Specifically, a stack of the soft PVC layer 220, the glass cloth layer 240, and the soft PVC layer 250 has a total thickness of 0.6 mm. The soft PVC layer 250 has a thickness of 0.1 mm. Like this, the screen fabric 200 may have a structure in which the glass cloth layer 240 is sandwiched between the soft PVC layers 220 and 250.

Figure 10A:
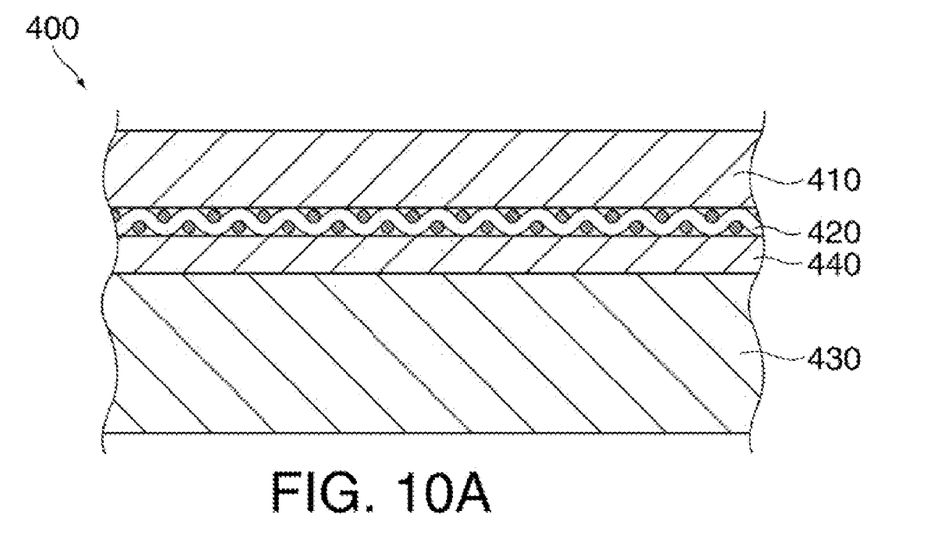
FIGS. 10A and 10B schematically show cross sections of a screen fabric according to a variation.
Figure 10B:
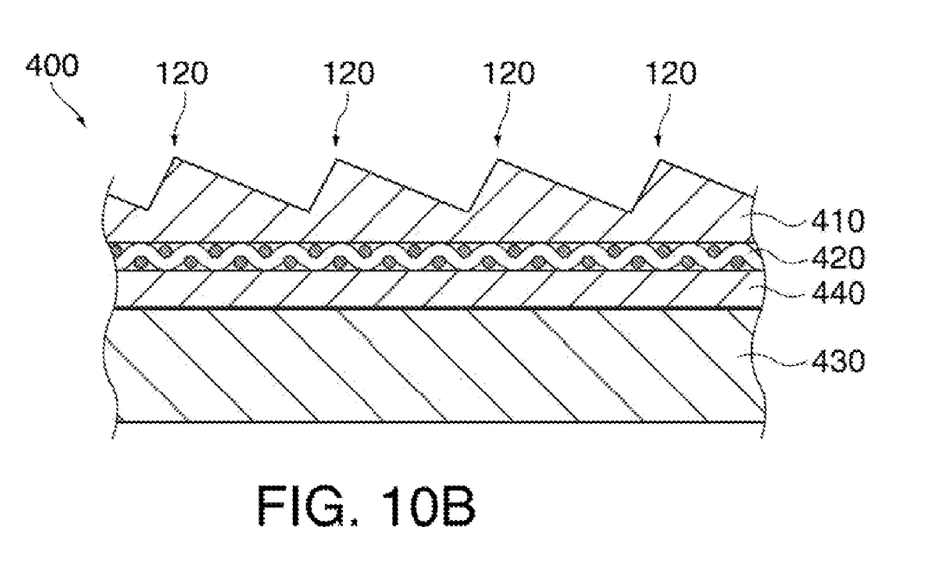

FIGS. 10A and 10B show a variation of the screen fabric 400 of the second embodiment. FIG. 10A shows the screen fabric 400 before embossing, and FIG. 10B shows the screen fabric 400 after embossing.

The screen fabric 400 shown in FIGS. 10A and 10B has an additional soft PVC layer 440 made of a soft vinyl chloride resin between the glass cloth layer 420 and the urethane layer 430, and is different from the fabric of the second embodiment in this respect. In other respects, the screen fabric 400 is the same as in the second embodiment. Specifically, the soft PVC layer 440 has a thickness of 0.1 mm. Like this, the screen fabric 400 may have a structure in which the glass cloth layer 420 and the urethane layer 430 are disposed with the soft PVC layer 440 therebetween. Because of the presence of the soft PVC layer 440 therebetween, the adhering area of the urethane layer 430 can be increased, increasing the welding adhesion of the urethane layer 430.

As long as the first layer is made of a vinyl chloride resin and the second layer is made of a material that is softer than the first layer, materials for the first and second layers according to the invention are not limited to the examples shown in the above embodiments. Table 1 shows the Shore A hardness of hard vinyl chloride resin (hard PVC), soft vinyl chloride resin (soft PVC), and materials applicable to the second layer (measurement conditions: hardness of JIS-K-6253).

TABLE 1

|  | Hard PVC | Soft PVC | Urethane Resin | Soft Polylactic Acid Compound | TPS Compound |
|---|---|---|---|---|---|
| Shore A Hardness | 110 | 66 | 55 | 55 | 60 |

As long as the structure includes a hard PVC layer 210 and a soft PVC layer 220 in the first embodiment or includes a soft PVC layer 410 and a urethane layer 430 in the second embodiment, the laminated structure is not limited to any of the above examples. For example, the laminated structure may be a multilayer structure including an additional layer.

As materials for forming the urethane layer 430 of the second embodiment or the variation thereof, as shown in Table 1, materials with a hardness comparable to that of a urethane resin, such as a soft polylactic acid compound, a TPS compound, and the like, are also usable in addition to the urethane resin. Specific examples of materials for the urethane layer 430 include, in addition to those shown in Table 1, various synthetic rubbers and natural rubbers. It is preferable that such a material is thermally weldable.

As long as the glass cloth layer 420/240 of the second embodiment/variation can reinforce the screen fabric 200/400, such a layer is not limited to a layer made of a glass cloth, and may be made of a hard vinyl chloride resin, etc.

In each of the above embodiments, the screen 100 has ridge portions 120 formed as three-dimensional portions on one surface of the substrate 110; however, the three-dimensional portions are not limited thereto. They may be in the form of a plurality of semi-circular depressions or semi-circular projections, and they may also be arranged in a reticular pattern.

In each of the above embodiments, the projector PJ has been described as a proximity-projection-type projector; however, the projector PJ is not limited thereto, and may also be a projector with a normal focal length. In addition, the projection direction of the projector PJ is not limited to the oblique incidence from a lower position in front of the screen 100.

In each of the above embodiments, the screen 100 has the ridge portions 120 formed in concentric circles on the substrate 110, which are arranged side by side with one another in the vertical direction, but this is a non-limiting example. For example, the screen may have ridge portions 120 extending in straight lines in the horizontal direction and arranged side by side with one another in the vertical direction.

In each of the above embodiments, the reflective layer 121A is formed only on the incidence-opposed planes 121 as shown in FIG. 3, but this is a non-limiting example. For example, the reflective layer 121A may also be formed over the entire projection area 110A (not only on the incidence-opposed planes 121 but also on the non-incidence planes 122). After the reflective layer 121A is formed over the entire area, a light absorption film may be formed on the reflective layer 121A.

In each of the above embodiments, the reflective layer 121A is formed by deposition of aluminum, but this is a non-limiting example. For example, it may be formed by spraying aluminum.

In each of the above embodiments, a protective film for protecting the reflective layer 121A may be formed on the reflective layer 121A. Further, the screen produced from the screen fabric 200/400 is not limited to a reflection-type screen. The screen fabric is also applicable to a transmission-type screen using transparent layers or films, with the reflective layer 121A being omitted.

In each of the above embodiments, the ridge portions 120 of the substrate 110 are formed using the press roller 330 (roll die), but this is a non-limiting example. For example, ridge portions 120 of the substrate 110 may be formed using a flat die having a planar surface. For example, the screen fabric 400 of the second embodiment can be produced as follows. With the glass cloth layer 420 facing up, a sheet made of a soft vinyl chloride resin having no back-side fabric is set on an electroforming die. A urethane foam is then placed on the set sheet, and a release material (specifically, a Teflon sheet) is placed on the top, followed by pressing. The release material allows the sheet to be released well during embossing.

The screen according to the invention can be applied to a screen for a proximity-projection-type projector.

The entire disclosure of Japanese Patent Application No. 2010-7879, filed Jan. 18, 2010 is expressly incorporated by reference herein.

What is claimed is:

1. A screen fabric comprising a stack of a plurality of layers,
the plurality of layers including:
a first layer that forms a surface layer on which a three-dimensional portion is to be formed,
a second layer that is different from the first layer, and
a reflective layer formed on at least a portion of the surface of the first layer opposite the second layer,
the first layer being made of a vinyl chloride resin, and
the second layer having a lower hardness than the first layer.

2. The screen fabric according to claim 1, wherein the first layer is made of a hard vinyl chloride resin, and the second layer is made of a soft vinyl chloride resin.

3. The screen fabric according to claim 1, wherein the screen fabric has a two-layer structure including the first layer and the second layer joined together.

4. The screen fabric according to claim 1, wherein the first layer is made of a soft vinyl chloride resin, and the second layer is resilient against the first layer.

5. The screen fabric according to claim 1, wherein the first layer is made of a soft vinyl chloride resin, and the second layer is an urethane layer.

6. The screen fabric according to claim 5, wherein the first layer and the second layer are joined via the glass cloth layer.

7. A screen comprising the screen fabric according to claim 1.

8. The screen fabric according to claim 1, further comprising a protective film, wherein the second layer is disposed between the first layer and the protective film.

9. The screen fabric according to claim 1, wherein the second layer has a Shore A hardness of between about 55 and 66.

* * * * *